US009036842B2

(12) United States Patent
Kim et al.

(10) Patent No.: US 9,036,842 B2
(45) Date of Patent: May 19, 2015

(54) POSITIONING AND REPRODUCING SCREEN SOUND SOURCE WITH HIGH RESOLUTION

(75) Inventors: Jung-ho Kim, Yongin-si (KR); So-young Jeong, Seoul (KR); Jeong-su Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1342 days.

(21) Appl. No.: 12/483,693

(22) Filed: Jun. 12, 2009

(65) Prior Publication Data

US 2010/0119092 A1 May 13, 2010

(30) Foreign Application Priority Data

Nov. 11, 2008 (KR) ........................ 10-2008-0111724

(51) Int. Cl.
*H04R 5/02* (2006.01)
*H04N 5/60* (2006.01)
*H04R 3/12* (2006.01)
*H04S 7/00* (2006.01)

(52) U.S. Cl.
CPC .. *H04R 3/12* (2013.01); *H04S 7/30* (2013.01); *H04R 2430/03* (2013.01); *H04R 2499/15* (2013.01); *H04R 2400/11* (2013.01); *H04R 2420/07* (2013.01)

(58) Field of Classification Search
USPC ........... 381/306, 300, 302, 303, 305, 308, 27, 381/77, 80, 81, 85, 89, 98; 348/738
See application file for complete search history.

(56) References Cited

U.S. PATENT DOCUMENTS

| | | | | |
|---|---|---|---|---|
| 6,829,018 B2 * | 12/2004 | Lin et al. | ........................ | 348/738 |
| 7,602,924 B2 * | 10/2009 | Kleen | ............................ | 381/61 |
| 2005/0047616 A1 * | 3/2005 | Lee | ............................... | 381/152 |
| 2006/0044419 A1 * | 3/2006 | Ozawa | ...................... | 348/231.99 |
| 2007/0104341 A1 * | 5/2007 | Kondo et al. | ................. | 381/306 |
| 2008/0019534 A1 * | 1/2008 | Reichelt et al. | ................. | 381/17 |
| 2008/0165992 A1 * | 7/2008 | Kondo et al. | ................. | 381/182 |

FOREIGN PATENT DOCUMENTS

| | | |
|---|---|---|
| EP | 1919259 A2 | 5/2008 |
| JP | 2-224495 | 9/1990 |
| JP | 2005-094271 | 4/2005 |
| KR | 10-0284768 | 12/2000 |
| KR | 10-2005-0053313 | 6/2005 |

OTHER PUBLICATIONS

European Search Report issued on May 15, 2012 in counterpart European Patent Application No. 09165810.4 (5 pages, in English).

(Continued)

*Primary Examiner* — Vivian Chin
*Assistant Examiner* — David Ton
(74) *Attorney, Agent, or Firm* — NSIP Law

(57) ABSTRACT

A virtual screen sound source is spatially synchronized with a visual object displayed on a display. A plurality of loudspeaker sets, which each include at least three of a plurality of loudspeakers installed at the periphery of a display, are selected, individual sound sources corresponding to the respective selected loudspeaker sets are generated, and a multi-sound source is generated by overlapping the generated individual sound sources and output through loudspeakers included in the loudspeaker sets.

21 Claims, 5 Drawing Sheets

(56) References Cited

OTHER PUBLICATIONS

Pulkki V "Virtual Sound Source Positioning Using Vector Base Amplitude Panning," Journal of the Audio Engineering Society, Audio Engineering Society, vol. 45, No. 6, Jun. 1, 1996 (11 pages, in English).
Chinese Office Action issued Dec. 28, 2012 in counterpart Chinese Patent Application No. 200910180435.8 (7 pages, in Chinese).

* cited by examiner

300

| Position | Loudspeaker Set 1 | Loudspeaker Set 2 |
|---|---|---|
| ⋮ | ⋮ | ⋮ |
| A | 2, 16, 19 | 3, 15, 19 |
| ⋮ | ⋮ | ⋮ |

POSITIONING AND REPRODUCING SCREEN SOUND SOURCE WITH HIGH RESOLUTION

CROSS REFERENCE TO RELATED APPLICATION(S)

This application claims the benefit under 35 U.S.C. §119 (a) of a Korean Patent Application No. 10-2008-111724, filed on Nov. 11, 2008, the disclosure of which is incorporated herein in its entirety by reference.

BACKGROUND

1. Field

The following description relates to an apparatus for positioning a screen sound source with high resolution and a method of reproducing the screen sound source.

2. Description of Related Art

With the wide-spread use of large-screen displays, demand for enhancing the user listening experience by spatially matching an image with a sound source has been increasing, and this has prompted a considerable amount of research into such spatial matching.

In order to spatially match an image with a sound source on a screen, a plurality of loudspeakers are two-dimensionally disposed on or behind the screen of a display, and a sound source is reproduced through a loudspeaker corresponding to a specific screen position.

This method can generate a sound source at an accurate position of a visual object displayed on the screen of the display, and it requires several loudspeakers to generate a sound source at a position on the screen of the display with high resolution.

In addition, the method should separately drive a large number of loudspeakers that are two-dimensionally disposed on or behind the screen of the display. Thus, an amplifier and controller are included for separately controlling the large number of loudspeakers.

For these reasons, the method can be employed in an application field such as theaters in which a large enough space is provided behind the screen. The method can be difficult to use in small-scale displays such as household flat panel televisions (TVs) whose front is made of glass.

SUMMARY

In one general aspect, an apparatus includes a controller and a multi-sound source processor coupled to the controller. The controller is configured to select a plurality of loudspeaker sets, with each set including at least three of a plurality of loudspeakers installed at the periphery of a display, in order to position a virtual screen sound source in synchronization with a visual object displayed at a specific position on a screen of the display. The multi-sound source processor is configured to generate individual sound sources corresponding to the respective loudspeaker sets selected by the controller, generate a multi-sound source by overlapping the generated individual sound sources, and output the multi-sound source through loudspeakers included in the loudspeaker sets.

Implementations may include one or more of the following features. For example, the multi-sound source processor may include a plurality of sound source generators configured to generate the individual sound sources for the respective loudspeaker sets selected by the controller from a sound source signal; a sound source synthesizer configured to generate the multi-sound source by synthesizing the individual sound sources generated by the respective sound source generators; a sound source amplifier configured to amplify the multi-sound source generated by the sound source synthesizer; and a loudspeaker output unit configured to select an output path to output the multi-sound source amplified by the sound source amplifier through the loudspeakers included in the loudspeaker sets selected by the controller. The multi-sound source processor may also include a band-pass filter configured to divide the sound source signal according to frequency band and output the divided sound source signals to the respective sound source generators.

The apparatus may include a digital-to-analog (DA) converter configured to convert digital sound source data into an analog sound source signal.

The controller may select at least two of the loudspeaker sets, with each set including loudspeakers disposed at vertices of virtual polygons, including a visual object position therein. The controller may select the loudspeaker sets that each includes at least three loudspeakers with reference to loudspeaker set information configured according to position on the screen of the display. The controller may select the loudspeaker sets in order of small to large maximum angles between a virtual screen sound source reference vector from a viewer to the visual object and virtual loudspeaker vectors from the viewer to respective loudspeakers. The controller may select the loudspeaker sets in order of small to large sums of angles between a virtual screen sound source reference vector from a viewer to the visual object and virtual loudspeaker vectors from the viewer to respective loudspeakers. The controller may select the loudspeaker sets in order of small to large averages of angles between a virtual screen sound source reference vector from a viewer to the visual object and virtual loudspeaker vectors from the viewer to respective loudspeakers. The controller may select the loudspeaker sets in order of small to large areas of the virtual polygons.

In another general aspect, a screen sound source with high resolution is reproduced by determining a position of a virtual screen sound source to be reproduced on the screen of a display in response to a sound source being input; selecting a plurality of loudspeaker sets corresponding to the determined virtual screen sound source position with reference to loudspeaker set information in response to the virtual screen sound source position being determined; generating individual sound sources corresponding to the respective selected loudspeaker sets; generating a multi-sound source by overlapping the generated individual sound sources; and outputting the generated multi-sound source through loudspeakers included in the selected loudspeaker sets.

Implementations may include one or more of the following features. For example, the generated multi-sound source may be outputted through loudspeakers included in the selected loudspeaker sets by amplifying and outputting the multi-sound source.

The individual sound sources corresponding to the respective selected loudspeaker sets may be generated by generating the individual sound sources by dividing a sound source signal according to frequency band.

In another general aspect, a screen sound source is reproduced with high resolution by determining a position of a virtual screen sound source to be reproduced on the screen of a display in response to a sound source being input; selecting at least two of loudspeaker sets, with each set including loudspeakers disposed at vertices of virtual polygons, including the determined virtual screen sound source position in response to the virtual screen sound source position being determined; generating individual sound sources corresponding to the respective selected loudspeaker sets; generating a multi-sound source by overlapping the generated individual sound sources; and outputting the generated multi-sound source through loudspeakers included in the selected loudspeaker sets.

Implementations may include one or more of the following features. For example, the generated multi-sound source may be outputted through loudspeakers included in the selected loudspeaker sets by amplifying and outputting the multi-sound source.

The individual sound sources corresponding to the respective selected loudspeaker sets may be generated by generating the individual sound sources by dividing a sound source signal according to frequency band.

The at least two of loudspeaker sets, with each including loudspeakers disposed at vertices of virtual polygons including the virtual screen sound source position, may be selected by selecting the loudspeaker sets in order of small to large maximum angles between a virtual screen sound source reference vector from a viewer to a visual object and virtual loudspeaker vectors from the viewer to respective loudspeakers.

The at least two of loudspeaker sets, with each including loudspeakers disposed at vertices of virtual polygons including the virtual screen sound source position, may be selected by selecting the loudspeaker sets in order of small to large sums of angles between a virtual screen sound source reference vector from a viewer to a visual object and virtual loudspeaker vectors from the viewer to respective loudspeakers.

The at least two of loudspeaker sets, with each set including loudspeakers disposed at vertices of virtual polygons including the virtual screen sound source position, may be selected by selecting the loudspeaker sets in order of small to large averages of angles between a virtual screen sound source reference vector from a viewer to a visual object and virtual loudspeaker vectors from the viewer to respective loudspeakers.

The at least two of loudspeaker sets, with each set including loudspeakers disposed at vertices of virtual polygons including the virtual screen sound source position, may be selected by selecting the loudspeaker sets in order of small to large areas of the virtual polygons.

In another general aspect, a plurality of loudspeaker sets, with each set including at least three of a plurality of loudspeakers installed at the periphery of a display, are selected, individual sound sources corresponding to the respective selected loudspeaker sets are generated, and a multi-sound source is generated by overlapping the generated individual sound sources and output through loudspeakers included in the loudspeaker sets.

In another additional aspect, the individual sound sources may be generated by dividing a sound source signal according to frequency band, and the multi-sound source may be generated by overlapping the generated individual sound sources.

Since a plurality of loudspeaker sets, with each set including at least three of a plurality of loudspeakers installed at the periphery of the display, are selected and a multi-sound source obtained by overlapping individual sound sources corresponding to the respective selected loudspeaker sets are output through loudspeakers included in the selected loudspeaker sets, the spatial resolving power of a virtual screen sound source spatially synchronized with a visual object displayed at a specific position on the screen of the display can be improved.

In addition, since a multi-sound source obtained by overlapping individual sound sources is output through a plurality of loudspeakers included in a plurality of selected loudspeaker sets, the sound pressure of a virtual screen sound source spatially synchronized with a visual object displayed at a specific position on the screen of the display can be improved.

Furthermore, individual sound sources are generated by dividing a sound source signal according to frequency band, a multi-sound source is generated by overlapping the generated individual sound sources, and thus a screen sound source can be reproduced in a wide frequency band.

The spatial resolving power of a virtual screen sound source spatially synchronized with a visual object displayed at a specific position on the screen of a display is improved. The sound pressure of a virtual screen sound source spatially synchronized with a visual object displayed at a specific position on the screen of a display is also improved. A screen sound source can be reproduced in a wide frequency band. A virtual screen sound source having improved spatial resolving power can be positioned in spatial synchronization with a visual object displayed at a specific position on the screen of a small-scale display, such as a household flat panel TV. Other features and aspects will be apparent from the following detailed description, the drawings, and the claims.

Figure 1:
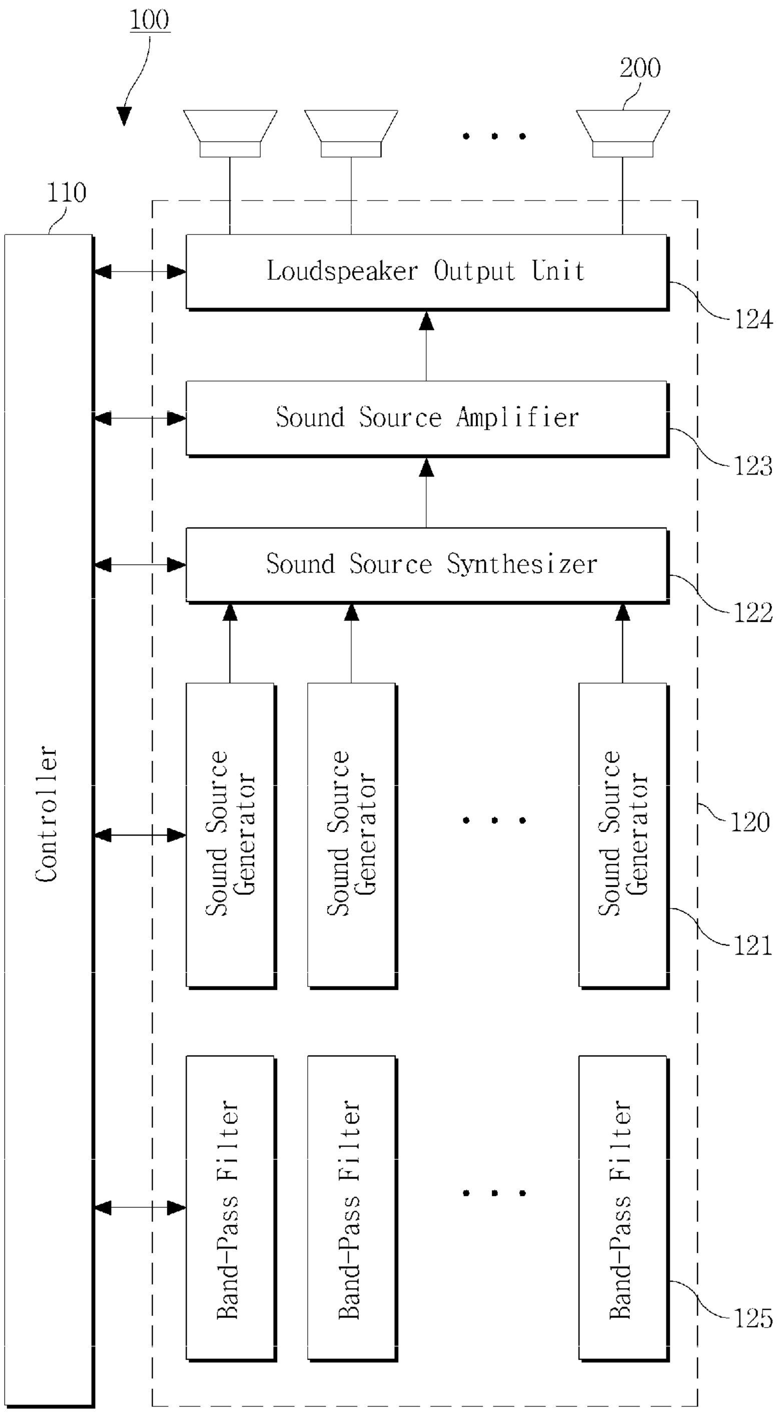
FIG. 1 is a block diagram of an exemplary apparatus for positioning a screen sound source with high resolution.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

In a small-scale display such as a household flat panel television (TV) whose front is made of glass, due to spatial limitations, it is impractical to two-dimensionally dispose a plurality of loudspeakers on or behind the screen of the display and spatially match an image with a sound source by reproducing the sound source through a loudspeaker corresponding to a specific position on the screen.

To reduce or minimize spatial limitations, a plurality of loudspeakers may be disposed outside the screen of the display, and some of the loudspeakers may be appropriately selected to reproduce a sound source that spatially matches the location of an image.

In a geometric structure in which a plurality of loudspeakers are disposed outside the screen of the display, it is difficult to uniformly divide the entire screen. Thus, the spatial resolving power for sound source positioning is limited to part of the screen.

In addition, small loudspeakers are used due to limited space outside the screen of the display. Thus, the small loudspeaker diameter of the small loudspeakers limits the range of output frequency and makes it difficult to output low-frequency components, and the small loudspeaker thickness limits installation of a permanent magnet and voice coil and makes it difficult to generate sufficient sound pressure.

Accordingly, exemplary embodiments that select a plurality of loudspeaker sets that each include at least three of a plurality of loudspeakers installed at the periphery of the display and thus can improve the spatial resolving power and sound pressure of a virtual screen sound source spatially synchronized with a visual object displayed at a specific position on the screen of the display and reproduce the screen sound source in a wide frequency band, will be described.

The term "high resolution" herein refers to improved spatial resolution power of sound.

Referring to FIG. 1, an apparatus 100 for positioning a screen sound source with high resolution includes a controller 110 and a multi-sound source processor 120.

In order to generate a virtual screen sound source in synchronization with a visual object displayed at a specific position on the screen of a display, the controller 110 selects a plurality of loudspeaker sets that each include at least three of a plurality of loudspeakers 200 installed at the periphery of the display.

The controller 110 may be implemented to select the loudspeaker sets using one or two methods. The first method is a lookup table-based loudspeaker set selection method that includes storing, in advance, information on loudspeaker sets configured according to position on the screen of the display and selecting a plurality of loudspeaker sets with reference to the loudspeaker set information.

The second method is a real-time computation-based loudspeaker set selection method that includes finding out, in real time, an optimum loudspeaker that can position a virtual screen sound source at the position of a visual object displayed on the screen of the display and selecting a plurality of loudspeaker sets. These methods will be described in detail below.

The multi-sound source processor 120 generates individual sound sources corresponding to the respective loudspeaker sets selected by the controller 110, generates a multi-sound source by overlapping the generated individual sound sources, and outputs the multi-sound source through the loudspeakers 200 included in the loudspeaker sets.

The multi-sound source processor 120 may include a plurality of sound source generators 121, a sound source synthesizer 122, a sound source amplifier 123, and a loudspeaker output unit 124.

The sound source generators 121 generate individual sound sources for the respective loudspeaker sets selected by the controller 110 from a sound source signal. Each of the individual sound sources may be a sound source signal converted from the original sound signal according to the characteristics of the loudspeakers 200 included in each of the selected loudspeaker sets.

To correct distortion of a sound source caused by difference in distance and angle between respective loudspeakers included in a loudspeaker set and a viewer, difference in human recognition of upper and lower-space resolving powers of a plane sound source, and difference in directivity of a sound source according to frequency, the sound source is positioned on the screen using a vector-based amplitude panning (VBAP) method, etc.

The VBAP method provides sound source vector components of three loudspeakers in space and positions a sound source in a virtual triangle having the three loudspeakers at its vertices using the vectors.

When a plurality of loudspeaker sets are selected by the controller 110, the sound source generators 121 generate individual sound sources corresponding to the respective selected loudspeaker sets using a method of correcting an original sound source signal using, for example, the VBAP method, etc.

The sound source synthesizer 122 generates a multi-sound source by synthesizing the individual sound sources generated by the sound source generators 121. For example, a mixer is used as the sound source synthesizer 122 to synthesize the individual sound sources generated by the sound source generators 121 and generate an overlapped multi-sound source.

The sound source amplifier 123 amplifies the multi-sound source generated by the sound source synthesizer 122. For example, a plurality of amplifiers are used as the sound source amplifier 123 to adjust the gains of the loudspeakers 200 included in each loudspeaker set and separately amplify the multi-sound source according to the characteristics of the loudspeakers 200.

The loudspeaker output unit 124 selects an output path to output the multi-sound source amplified by the sound source amplifier 123 through the loudspeakers 200 included in the loudspeaker sets selected by the controller 110. For example, a matrix switch, which selects n outputs from m inputs, is used as the loudspeaker output unit 124 to output the amplified multi-sound source through the loudspeakers 200 included in the loudspeaker sets selected by the controller 110.

In this way, a plurality of loudspeaker sets, which each include at least three of a plurality of loudspeakers installed at the periphery of a display, are selected, a multi-sound source obtained by overlapping individual sound sources corresponding to the respective selected loudspeaker sets is output through loudspeakers included in the selected loudspeaker sets, and thus a viewer can hear the multi-sound source as one sound source. Consequently, the spatial resolving power of a virtual screen sound source spatially synchronized with a visual object displayed at a specific position on the screen of the display is improved.

Moreover, since a multi-sound source obtained by overlapping individual sound sources is output through many loudspeakers included in a plurality of selected loudspeaker sets, the sound pressure of a virtual screen sound source spatially synchronized with a visual object displayed at a specific position on the screen of the display can be improved.

The multi-sound source processor 120 may additionally include one or more band-pass filters 125. The band-pass filter 125 divides the sound source signal according to frequency band and outputs the divided sound source signals to the respective sound source generators 121.

A sound source reproduced through a loudspeaker 200 has directivity varying according to frequency. More specifically, in the case of low frequency, sound pressure is emitted in all directions and has no directivity. In addition, the higher a frequency, the higher sound pressure emitted in the front direction, and the lower sound pressure emitted in the other directions.

In this example, the band-pass filter 125 divides the sound source signal according to frequency band, outputs the divided sound source signals to the respective sound source generators 121, and the sound source generators 121 generate individual signals according to frequency band, respectively.

The individual signals generated according to frequency band are synthesized by the sound source synthesizer 122, and a multi-sound source obtained by overlapping the individual signals is output through a plurality of loudspeakers included in respective selected loudspeaker sets. Thus, it is possible to reproduce a screen sound source in a wide frequency band.

Here, a narrow interval between loudspeakers is preferable for high frequency, and a wide interval between loudspeakers is preferable for low frequency. These characteristics may be reflected in the selection of loudspeaker sets.

In some implementations, the controller 110 may be implemented to select at least two of loudspeaker sets that each includes loudspeakers disposed at vertices of virtual polygons including the position of a visual object. This particular implementation employs the second method, that is, the real-time computation-based loudspeaker set selection method.

Figures 2, 3:
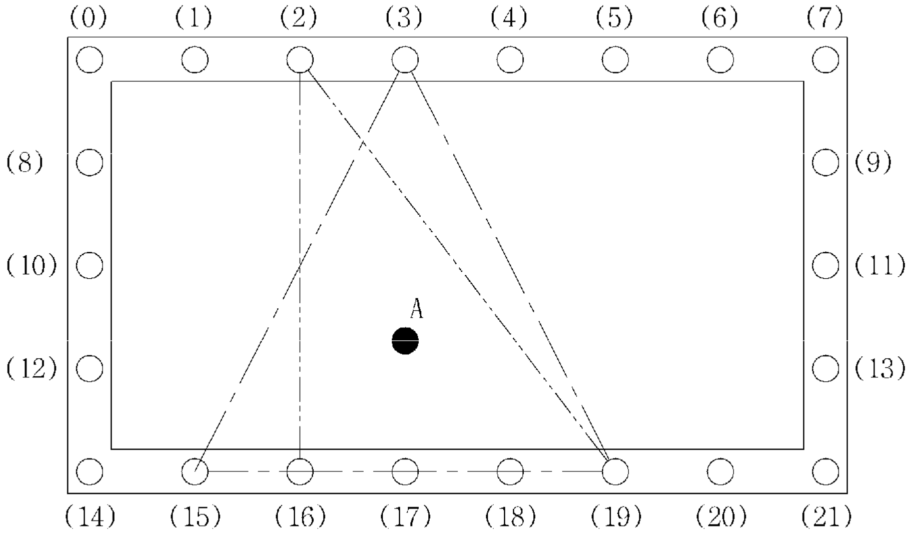
FIG. 2 is an illustration of an example of loudspeaker selection for screen sound source positioning.
FIG. 3 is a chart of an exemplary loudspeaker set information.

Referring to FIG. 2, a screen 300 is shown surrounded by loudspeakers 0-21. To position a screen sound source at visual object position A on the screen 300 of the display, a plurality of loudspeaker sets, that is, a loudspeaker set including loudspeaker 2, loudspeaker 16 and loudspeaker 19, and a loudspeaker set including loudspeaker 3, loudspeaker 15 and loudspeaker 19, for example, are selected.

The controller 110 may be implemented to select a plurality of loudspeaker sets, where each set includes at least three loudspeakers with reference to loudspeaker set information configured according to position on the screen 300 of the display. This particular implementation employs the first method, that is, the lookup table-based loudspeaker set selection method.

Referring to FIG. 3, to position a screen sound source at visual object position A on the screen 300 of the display, a plurality of loudspeaker sets, that is, loudspeaker set 1 including loudspeaker 2, loudspeaker 16 and loudspeaker 19, and loudspeaker set 2 including loudspeaker 3, loudspeaker 15 and loudspeaker 19, for example, are selected with reference to the loudspeaker set information shown in FIG. 3.

Figure 4:
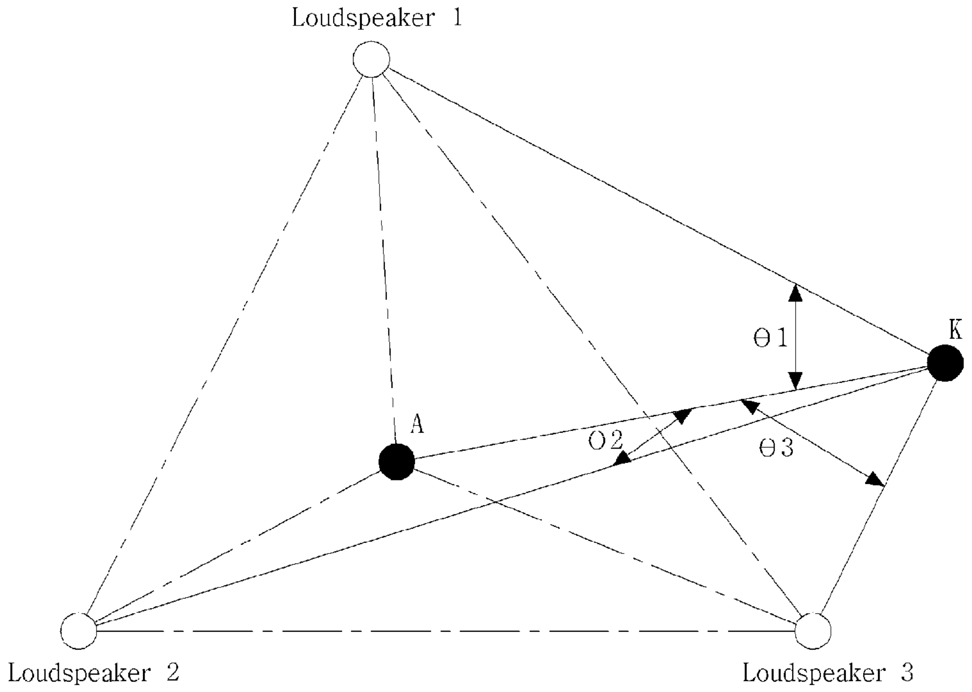
FIG. 4 is a diagram of exemplary virtual vectors for loudspeaker set selection.

The controller 110 selects a plurality of loudspeaker sets, as described with reference to FIG. 4. A plurality of loudspeaker sets can be selected to generate loudspeaker set information; the method for doing so is the same as above, and a description thereof is omitted. Referring to FIG. 4, an example of virtual vectors for loudspeaker set selection is shown.

For example, it is assumed that angles between a virtual screen sound source reference vector from a viewer K to a visual object position A and virtual loudspeaker vectors from the viewer K to loudspeakers 1, 2 and 3, which are vertices of a virtual triangle including the visual object position A therein, are Θ1, Θ2 and Θ3.

Θ1, Θ2 and Θ3 may be calculated from respective loudspeakers included in each of a plurality of detected loudspeaker sets, and some of the detected loudspeaker sets may be selected using the calculated Θ1, Θ2 and Θ3 of each loudspeaker set. In this way, one loudspeaker set can be selected from a plurality of detected loudspeaker sets. Meanwhile, the position of the viewer K may be determined by, for example, selecting a position in a direction perpendicular to the visual object position A.

In some implementations, the controller 110 may be implemented to select loudspeaker sets in order of small to large maximum angles between a virtual screen sound source reference vector from a viewer to a visual object and virtual loudspeaker vectors from the viewer to respective loudspeakers.

For example, in this case, the maximum of Θ1, Θ2 and Θ3 calculated from each loudspeaker set is selected, the selected maximums are compared with each other, and loudspeaker sets are selected in order of small to large maximums. When two loudspeaker sets are selected, loudspeaker sets having the smallest maximum and the second smallest maximum are selected.

In some implementations, the controller 110 may be implemented to select loudspeaker sets in order of small to large sums of angles between a virtual screen sound source reference vector from a viewer to a visual object and virtual loudspeaker vectors from the viewer to respective loudspeakers.

For example, in this case, Θ1, Θ2 and Θ3 calculated from each loudspeaker set are summed up, and loudspeaker sets are selected in order of small to large sums. When two loudspeaker sets are selected, loudspeaker sets having the smallest sum and the second smallest sum are selected.

In some implementations, the controller 110 may be implemented to select loudspeaker sets in order of small to large averages of angles between a virtual screen sound source reference vector from a viewer to a visual object and virtual loudspeaker vectors from the viewer to respective loudspeakers.

For example, in this case, Θ1, Θ2 and Θ3 calculated from each loudspeaker set are averaged, and loudspeaker sets are selected in order of small to large averages. When two loudspeaker sets are selected, loudspeaker sets having the smallest average and the second smallest average are selected In some implementations, the controller 110 may be configured to calculate the area of a virtual polygon of each loudspeaker set including loudspeakers disposed at vertices of the virtual polygon including the position of a visual object therein, and select loudspeaker sets in order of small to large areas of the virtual polygons. Since the positions of the loudspeakers included in each loudspeaker set are determined in advance, the areas of the virtual polygons can be obtained by mathematical operations.

Figure 5:
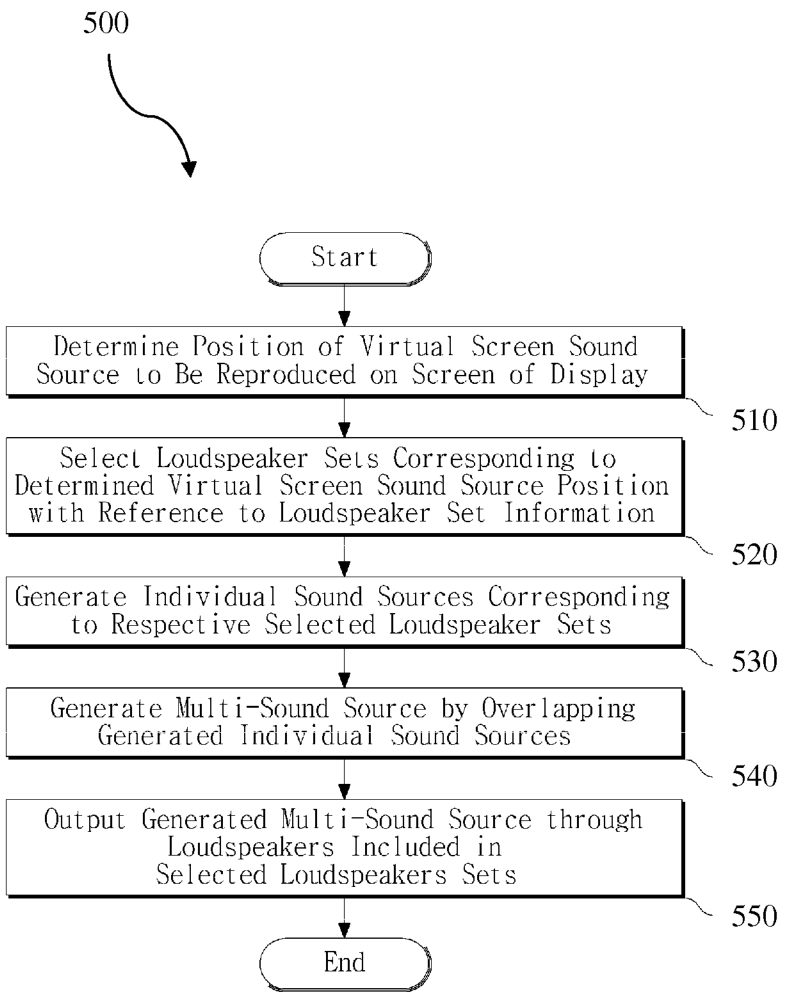
FIG. 5 is a flowchart of an exemplary procedure for positioning a screen sound source with high resolution according.
Figure 6:
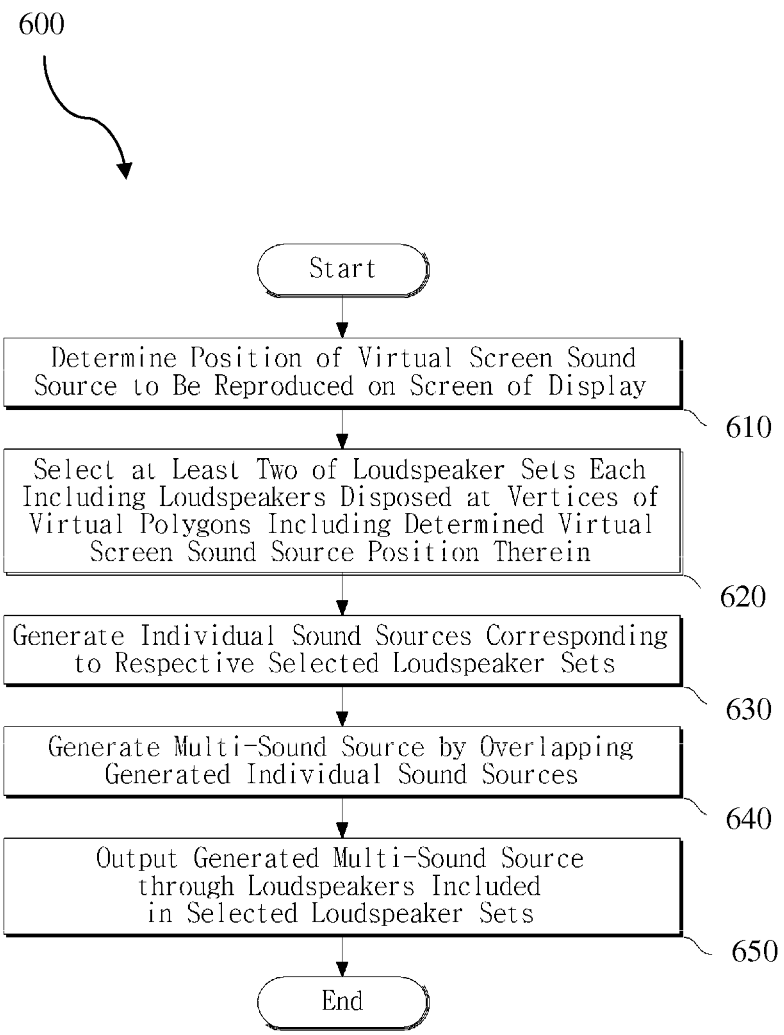
FIG. 6 is a flowchart of an exemplary procedure for positioning a screen sound source with high resolution.

The screen sound source reproducing operation of the screen sound source positioning apparatus 100 having the above-described constitution will be described with reference to FIGS. 5 and 6. Referring to FIG. 5, an exemplary procedure 500 is performed for positioning a screen sound source with high resolution. Referring to FIG. 6, an exemplary procedure 600 is performed for positioning a screen sound source with high resolution.

In FIG. 5, a screen sound source is reproduced using the above-mentioned lookup table-based loudspeaker set selection method. When a sound source is input, the screen sound source positioning apparatus 100 determines the position of a virtual screen sound source to be reproduced on the screen of the display in operation 510.

For example, the screen sound source positioning apparatus 100 may analyze output visual information to extract a visual object that will be synchronized with the virtual screen sound source to be reproduced, calculate information on the position of the extracted visual object on the screen, and determine the position of the virtual screen sound source to be reproduced from the calculated position information.

When the position of the virtual screen sound source is determined in operation 510, the screen sound source positioning apparatus 100 selects a plurality of loudspeaker sets corresponding to the determined virtual screen sound source position with reference to loudspeaker set information in operation 520.

The method of selecting a plurality of loudspeaker sets to position a virtual screen sound source to be synchronized with a visual object with reference to loudspeaker set information has been described above and will not be repeated.

When a plurality of loudspeaker sets are selected in operation 520, the screen sound source positioning apparatus generates individual sound sources corresponding to the respective selected loudspeaker sets in operation 530. In operation 530, individual sound sources may be generated by dividing a sound source signal according to frequency band. The method of generating individual sound sources corresponding to respective selected loudspeakers sets has been described above and will not be repeated.

When individual sound sources corresponding to the respective loudspeaker sets are generated in operation 530, the screen sound source positioning apparatus generates a multi-sound source by overlapping the generated individual sound sources in operation 540. In operation 550, the screen sound source positioning apparatus outputs the multi-sound source generated in operation 540 through loudspeakers included in the selected loudspeaker sets. In operation 550, the multi-sound source may be amplified and output.

In this way, a plurality of loudspeaker sets, with each set including at least three of a plurality of loudspeakers installed at the periphery of the display, are selected, and a multi-sound source obtained by overlapping individual sound sources corresponding to the respective selective loudspeaker sets is output through loudspeakers included in the selected loudspeaker sets, such that the spatial resolving power of a virtual screen sound source spatially synchronized with a visual object displayed at a specific position on the screen of the display can be improved.

In addition, since a multi-sound source obtained by overlapping individual sound sources is output through a plurality of loudspeakers included in a plurality of selected loudspeaker sets, the sound pressure of a virtual screen sound source spatially synchronized with a visual object displayed at a specific position on the screen of the display can be improved.

Furthermore, individual sound sources are generated by dividing a sound source signal according to frequency band, a multi-sound source is generated by overlapping the generated individual sound sources, and thus a screen sound source can be reproduced in a wide frequency band.

As shown in FIG. 6, a screen sound source is reproduced using the above-mentioned real-time computation-based loudspeaker set selection method. Referring to FIG. 6, when a sound source is input, the screen sound source positioning apparatus determines the position of a virtual screen sound source to be reproduced on the screen of the display in operation 610.

For example, the screen sound source positioning apparatus 100 may analyze output visual information to extract a visual object that will be synchronized with the virtual screen sound source to be reproduced, calculate information on the position of the extracted visual object on the screen, and determine the position of the virtual screen sound source to be reproduced from the calculated position information.

After the position of the virtual screen sound source is determined in operation 610, the screen sound source positioning apparatus 100 selects at least two of loudspeaker sets, with each set including loudspeakers disposed at vertices of virtual polygons including the determined virtual screen sound source position therein in operation 620.

Here, loudspeaker sets may be selected in order of small to large maximum angles between a virtual screen sound source reference vector from a viewer to a visual object and virtual loudspeaker vectors from the viewer to respective loudspeakers.

Otherwise, loudspeaker sets may be selected in order of small to large sums of angles between a virtual screen sound source reference vector from a viewer to a visual object and virtual loudspeaker vectors from the viewer to respective loudspeakers.

Otherwise, loudspeaker sets may be selected in order of small to large averages of angles between a virtual screen sound source reference vector from a viewer to a visual object and virtual loudspeaker vectors from the viewer to respective loudspeakers.

Otherwise, loudspeaker sets may be selected from among loudspeaker sets that each includes loudspeakers disposed at vertices of virtual polygons including the position of a visual object therein in order of small to large areas of the virtual polygons.

After a plurality of loudspeaker sets are selected in operation 620, the screen sound source positioning apparatus 100 generates individual sound sources corresponding to the respective selected loudspeaker sets in operation 630. In operation 630, individual sound sources may be generated by dividing a sound source signal according to frequency band. The method of generating individual sound sources corresponding to respective selected loudspeakers sets has been described above and will not be repeated.

When individual sound sources corresponding to the respective loudspeaker sets are generated in operation 630, the screen sound source positioning apparatus 100 generates a multi-sound source by overlapping the generated individual sound sources in operation 640. In operation 650, the screen sound source positioning apparatus 100 outputs the multi-sound source generated in operation 640 through loudspeakers included in the selected loudspeaker sets. In operation 650, the multi-sound source may be amplified and output.

In this way, a plurality of loudspeaker sets, with each set including at least three of a plurality of loudspeakers installed at the periphery of a display, are selected, and a multi-sound source obtained by overlapping individual sound sources corresponding to the respective selective loudspeaker sets is output through loudspeakers included in the selected loudspeaker sets, such that the spatial resolving power of a virtual screen sound source spatially synchronized with a visual object displayed at a specific position on the screen of the display can be improved.

In addition, since a multi-sound source obtained by overlapping individual sound sources is output through a plurality of loudspeakers included in a plurality of selected loudspeaker sets, the sound pressure of a virtual screen sound source spatially synchronized with a visual object displayed at a specific position on the screen of the display can be improved.

Furthermore, individual sound sources are generated by dividing a sound source signal according to frequency band, a multi-sound source is generated by overlapping the generated individual sound sources, and thus a screen sound source can be reproduced in a wide frequency band.

As apparent from the above description, the exemplary embodiments can improve the spatial resolving power and sound pressure of a virtual screen sound source spatially synchronized with a visual object displayed at a specific position on the screen of a display, and can reproduce a screen sound source in a wide frequency band.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for positioning a screen sound source with high resolution, the apparatus comprising:

a controller configured to select a plurality of loudspeaker sets, with each set including at least three of a plurality of loudspeakers installed at the periphery of a display, in order to position a virtual screen sound source in synchronization with a visual object displayed at a specific position on a screen of the display; and a multi-sound source processor configured to generate individual sound sources corresponding to the respective loudspeaker sets selected by the controller, generate a multi-sound source by overlapping the generated individual sound sources, and output the multi-sound source through loudspeakers included in the loudspeaker sets.

2. The apparatus of claim 1, wherein the multi-sound source processor includes:

a plurality of sound source generators configured to generate the individual sound sources for the respective loudspeaker sets selected by the controller from a sound source signal;

a sound source synthesizer configured to generate the multi-sound source by synthesizing the individual sound sources generated by the respective sound source generators;

a sound source amplifier configured to amplify the multi-sound source generated by the sound source synthesizer; and a loudspeaker output unit configured to select an output path to output the multi-sound source amplified by the sound source amplifier through the loudspeakers included in the loudspeaker sets selected by the controller.

3. The apparatus of claim 2, wherein the multi-sound source processor further includes:

a band-pass filter configured to divide the sound source signal according to frequency band and output the divided sound source signals to the respective sound source generators.

4. The apparatus of claim 1, further comprising:

a digital-to-analog (DA) converter configured to convert digital sound source data into an analog sound source signal.

5. The apparatus of claim 1, wherein the controller selects at least two of the loudspeaker sets, with each set including loudspeakers disposed at vertices of virtual polygons, including a visual object position therein.

6. The apparatus of claim 5, wherein the controller selects the loudspeaker sets that each include at least three loudspeakers with reference to loudspeaker set information configured according to position on the screen of the display.

7. The apparatus of claim 5, wherein the controller selects the loudspeaker sets in order of small to large maximum angles between a virtual screen sound source reference vector from a viewer to the visual object and virtual loudspeaker vectors from the viewer to respective loudspeakers.

8. The apparatus of claim 5, wherein the controller selects the loudspeaker sets in order of small to large sums of angles between a virtual screen sound source reference vector from a viewer to the visual object and virtual loudspeaker vectors from the viewer to respective loudspeakers.

9. The apparatus of claim 5, wherein the controller selects the loudspeaker sets in order of small to large averages of angles between a virtual screen sound source reference vector from a viewer to the visual object and virtual loudspeaker vectors from the viewer to respective loudspeakers.

10. The apparatus of claim 5, wherein the controller selects the loudspeaker sets in order of small to large areas of the virtual polygons.

11. The apparatus of claim 1, wherein an original sound source signal is converted according to characteristics of the loudspeaker sets to create the individual sound sources corresponding to the loudspeaker sets.

12. A method of reproducing a screen sound source with high resolution, the method comprising:

in response to a sound source being input, determining a position of a virtual screen sound source to be reproduced on the screen of a display;

in response to the virtual screen sound source position being determined, selecting a plurality of loudspeaker sets corresponding to the determined virtual screen sound source position with reference to loudspeaker set information;

generating individual sound sources corresponding to the respective selected loudspeaker sets;

generating a multi-sound source by overlapping the generated individual sound sources; and outputting the generated multi-sound source through loudspeakers included in the selected loudspeaker sets.

13. The method of claim 12, wherein outputting the generated multi-sound source through loudspeakers included in the selected loudspeaker sets comprises amplifying and outputting the multi-sound source.

14. The method of claim 12, wherein generating individual sound sources corresponding to the respective selected loudspeaker sets comprises generating the individual sound sources by dividing a sound source signal according to frequency band.

15. A method of reproducing a screen sound source with high resolution, the method comprising:

in response to a sound source being input, determining a position of a virtual screen sound source to be reproduced on the screen of a display;

in response to the virtual screen sound source position being determined, selecting at least two of loudspeaker sets, with each set including loudspeakers disposed at vertices of virtual polygons, including the determined virtual screen sound source position;

generating individual sound sources corresponding to the respective selected loudspeaker sets;

generating a multi-sound source by overlapping the generated individual sound sources; and outputting the generated multi-sound source through loudspeakers included in the selected loudspeaker sets.

16. The method of claim 15, wherein outputting the generated multi-sound source through loudspeakers included in the selected loudspeaker sets comprises amplifying and outputting the multi-sound source.

17. The method of claim 15, wherein generating individual sound sources corresponding to the respective selected loudspeaker sets comprises generating the individual sound sources by dividing a sound source signal according to frequency band.

18. The method of claim 15, wherein selecting at least two of loudspeaker sets, with each including loudspeakers disposed at vertices of virtual polygons including the virtual screen sound source position comprises selecting the loudspeaker sets in order of small to large maximum angles between a virtual screen sound source reference vector from a viewer to a visual object and virtual loudspeaker vectors from the viewer to respective loudspeakers.

19. The method of claim 15, wherein selecting at least two of loudspeaker sets, with each including loudspeakers disposed at vertices of virtual polygons including the virtual screen sound source position comprises selecting the loudspeaker sets in order of small to large sums of angles between a virtual screen sound source reference vector from a viewer to a visual object and virtual loudspeaker vectors from the viewer to respective loudspeakers.

20. The method of claim 15, wherein selecting at least two of loudspeaker sets, with each set including loudspeakers disposed at vertices of virtual polygons including the virtual screen sound source position comprises selecting the loudspeaker sets in order of small to large averages of angles between a virtual screen sound source reference vector from a viewer to a visual object and virtual loudspeaker vectors from the viewer to respective loudspeakers.

21. The method of claim 15, wherein selecting at least two of loudspeaker sets, with each set including loudspeakers disposed at vertices of virtual polygons including the virtual screen sound source position comprises selecting the loudspeaker sets in order of small to large areas of the virtual polygons.

* * * * *